(12) United States Patent
Lee et al.

(10) Patent No.: US 12,374,130 B2
(45) Date of Patent: Jul. 29, 2025

(54) METHOD FOR GROUPING CELLS ACCORDING TO DENSITY AND ELECTRONIC DEVICE EMPLOYING METHOD

(71) Applicant: HON HAI PRECISION INDUSTRY CO., LTD., New Taipei (TW)

(72) Inventors: Wan-Jhen Lee, New Taipei (TW); Chih-Te Lu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 631 days.

(21) Appl. No.: 17/684,538

(22) Filed: Mar. 2, 2022

(65) Prior Publication Data
US 2022/0284720 A1 Sep. 8, 2022

(30) Foreign Application Priority Data
Mar. 4, 2021 (CN) .......................... 202110241585.6

(51) Int. Cl.
| | |
|---|---|
| *G06V 20/69* | (2022.01) |
| *G06N 3/045* | (2023.01) |
| *G06V 10/77* | (2022.01) |
| *G06V 10/774* | (2022.01) |
| *G06V 10/776* | (2022.01) |
| *G06V 10/82* | (2022.01) |
| *G06V 10/98* | (2022.01) |

(52) U.S. Cl.
CPC ........... *G06V 20/695* (2022.01); *G06N 3/045* (2023.01); *G06V 10/7715* (2022.01); *G06V 10/774* (2022.01); *G06V 10/776* (2022.01); *G06V 10/82* (2022.01); *G06V 10/98* (2022.01); *G06V 2201/03* (2022.01)

(58) Field of Classification Search
CPC ............ G06V 20/695; G06V 10/7715; G06V 10/774; G06V 10/776; G06V 10/82; G06V 10/98; G06V 2201/03; G06N 3/045; G06N 3/08; G06N 3/0455; G06T 7/0012; G06T 2207/20081; G06T 2207/20084
See application file for complete search history.

(56) References Cited

U.S. PATENT DOCUMENTS

| | | | |
|---|---|---|---|
| 2019/0130279 A1* | 5/2019 | Beggel | ................... G06V 10/82 |
| 2022/0180189 A1* | 6/2022 | Adrian | ................... G06N 3/047 |
| 2023/0030506 A1* | 2/2023 | Jaber | ................... G06F 18/2413 |

* cited by examiner

*Primary Examiner* — John Villecco
*Assistant Examiner* — Han Hoang
(74) *Attorney, Agent, or Firm* — ScienBiziP, P.C.

(57) ABSTRACT

A method of grouping certain cell densities to establish the number and volume of cells appearing in an image input the image into a self-encoder having a preset number of a density grouping models to obtain a preset number of reconstructed images. The image and each reconstructed image are input into a twin network model of the density grouping model corresponding to each reconstructed image, and a first error value is calculated between the image and each reconstructed image. A minimum first error value in the first error value set is determined, and a density range corresponding to the density grouping model corresponding to minimum first error value is taken as the density range. An electronic device and a non-volatile storage medium performing the above-described method are also disclosed.

14 Claims, 3 Drawing Sheets

METHOD FOR GROUPING CELLS ACCORDING TO DENSITY AND ELECTRONIC DEVICE EMPLOYING METHOD

FIELD

The subject matter herein generally relates to the field of image processing, in particular to cell density grouping method and electronic device.

BACKGROUND

In image processing, to calculate the number and volume of cells in an image, the proportions of cells in the image need to be calculated. This requires the different densities of cells appearing in the image to be grouped, and the calculation process is complex, taking a lot of time.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
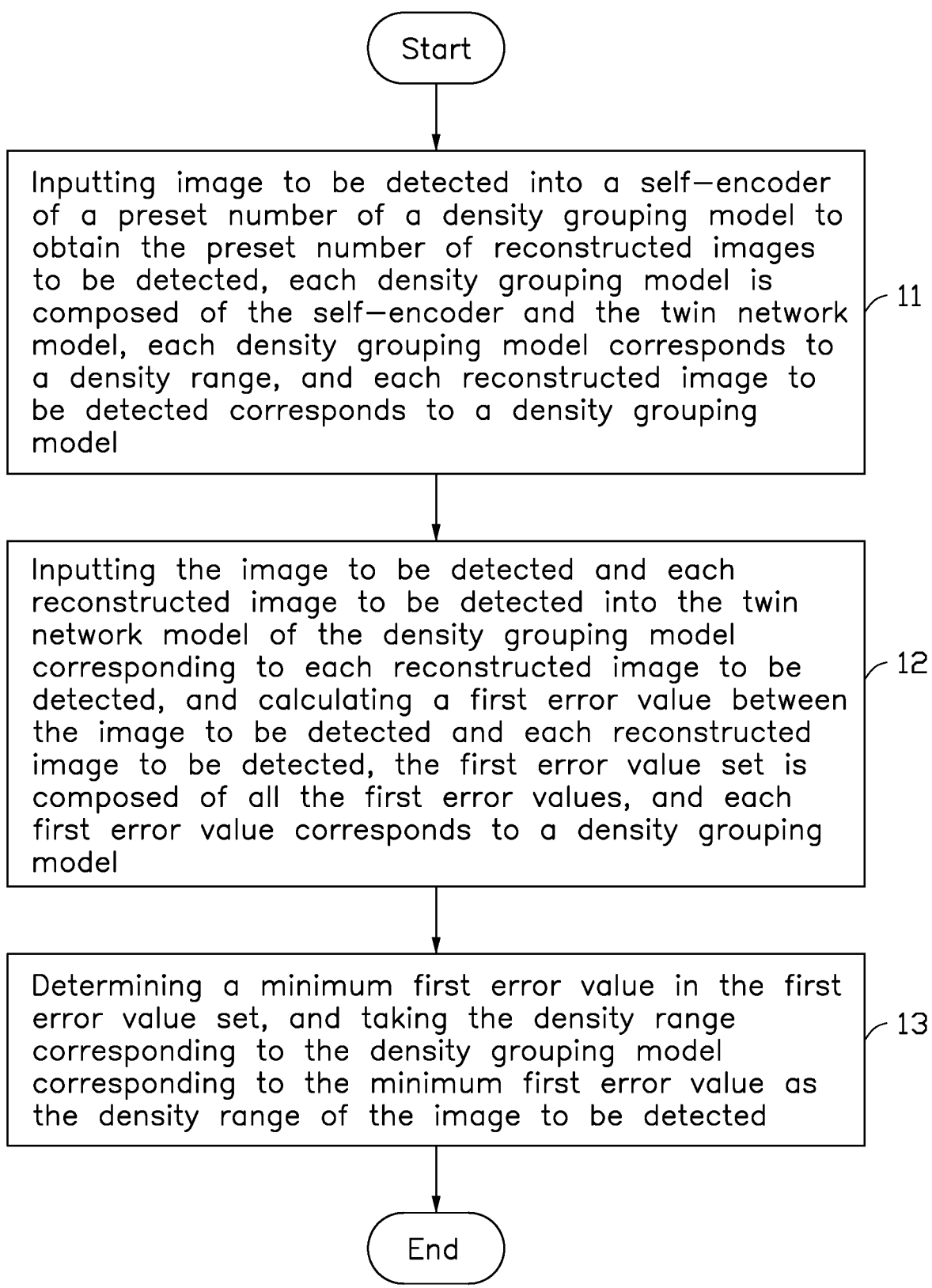
FIG. 1 is flowchart of an embodiment of a method for grouping cell density according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

The method of the present disclosure is applied to one or more electronic devices. The electronic device is hardware which includes but is not limited to microprocessor, application specific integrated circuit (ASIC), programmable gate array (FPGA), digital signal processor (DSP), or embedded devices.

The electronic device can be a desktop computer, a notebook computer, a tablet computer, a cloud server, and other computing device. The electronic device can carry out human-computer interaction with the user through a keyboard, a mouse, a remote controller, a touch pad, or a voice control device.

Figure 3:
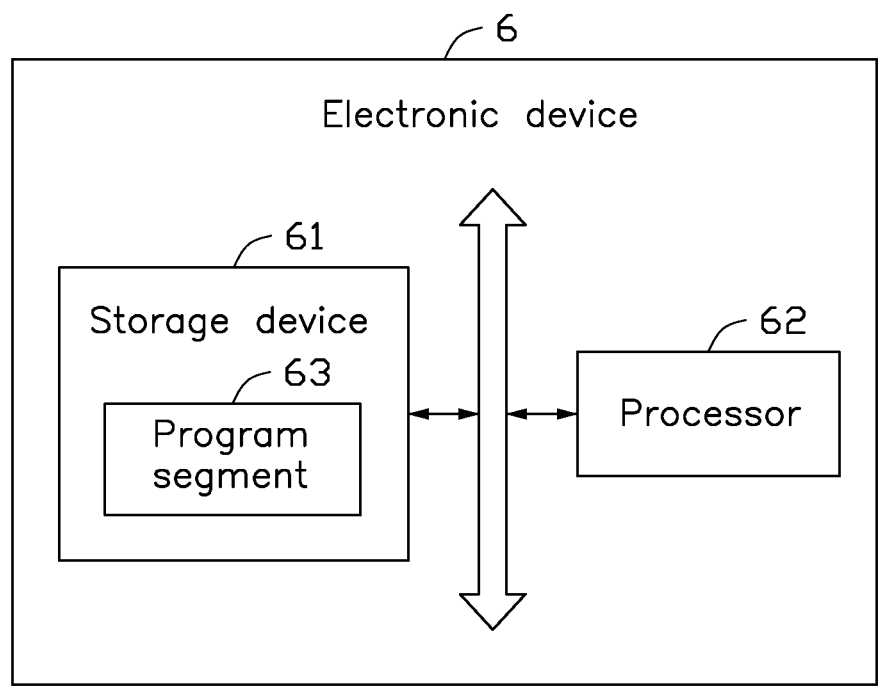
FIG. 3 is block diagram of an embodiment of an electronic device according to the present disclosure.

FIG. 1 illustrates a flow chart of one embodiment of the method of the present disclosure. The method for grouping cell density can be applied to an electronic device 6 (as shown in FIG. 3).

The function for grouping provided by the method of the present disclosure can be directly integrated on the electronic device 6, or run on the electronic device 6 in the form of a software development kit (SDK).

As shown in FIG. 1, the cell density grouping method includes the following steps:

At block 11, inputting images to be detected into a self-encoder of a preset number of a density grouping model to obtain a preset number of reconstructed images, each density grouping model is composed of the self-encoder and the twin network model, each density grouping model corresponds to a density range, and each reconstructed image corresponds to a density grouping model.

For example, the preset number can be 4, the four density grouping models correspond to four density ranges (0, 40%), (40%, 60%), (60%, 80%) and (80%, 100%). The images to be detected are input into the self-encoder of four density grouping models to obtain four reconstructed images, the four reconstructed images are A, B, C, and D.

At block 12, inputting the image to be detected and each reconstructed image into the twin network model of the density grouping model corresponding to each reconstructed image, and calculating a first error value between the image to be detected and each reconstructed image, the first error value set is composed of all the first error values, each first error value corresponding to a density grouping model.

For example, the image to be detected and reconstructed image A are input into the twin network model of the density grouping model corresponding to the density range (0, 40%), and the image to be detected and the reconstructed image B are input into the twin network model of the density grouping model corresponding to the density range (40%, 60%). The reconstructed image C can input into the twin network model of the density grouping model corresponding to the density range (60%, 80%), the image and the reconstructed image D can input into the twin network model of the density grouping model corresponding to the density range (80%, 100%). Calculate a first error value between the image and each reconstructed image, the first error value set is composed of all the first error values, and each first error value corresponds to a density grouping model.

At block 13, determining a minimum first error value in the first error value set, and the density range corresponding to the density grouping model corresponding to the minimum first error value is taken as the density range of the image.

For example, when the minimum first error value in the first error value set is 10%, the density range (60%, 80%) corresponding to the density grouping model corresponding to the minimum first error value is taken as the density range of the image.

In one embodiment, the cell density grouping method further includes the step of training the density grouping model.

In one embodiment, training the density grouping model includes:

Dividing cell image set according to the density range to obtain a preset number of cell training image sets, each cell training image set corresponding to a density range;

Performing the training operation on each cell training image set to obtain a preset number of density grouping models, each density grouping model corresponding to a density range;

The training operation includes:

Converting the cell training image in the cell training image set into a cell training image vector, a cell training image vector set is composed of all the cell training image vectors.

Using the cell training image vector set to train the self-encoder to obtain the trained self-encoder;

Inputting the cell training image vector set into the trained self-encoder of the density grouping model to obtain the cell reconstruction image vector set, the cell reconstruction image vector set including a cell reconstruction image vector;

Using the cell training image vector set and the cell reconstruction image vector set to train the twin network model to obtain the trained twin network model, the trained self-encoder and the trained twin network model forming the density grouping model.

For example, four cell training image sets are obtained by dividing the cell image sets into four density ranges (0, 40%), (40%, 60%), (60%, 80%) and (80%, 100%). The training operation is performed on each cell training image set to obtain four density grouping models, each density grouping model corresponding to a density range.

In one embodiment, using the cell training image vector set to train the self-encoder to obtain the trained self-encoder, includes:

Inputting the cell training image vector in the cell training image vector set into a coding layer of the self-encoder to obtain the hidden vector of the cell training image vector;

Inputting the hidden vector into a decoding layer of the self-encoder to obtain the reconstructed image vector of the cell training image vector;

Calculating a second error value between the cell training image vector and the reconstructed image vector through a preset error function and adjusting the parameters of the encoding layer and the decoding layer to minimize the error value, to obtain the self-encoder of the density grouping model;

In one embodiment, when the preset error function is the minimum absolute value error function, calculating a second error value between the cell training image vector and the reconstructed image vector through the minimum absolute value function error, the calculation formula is $$MAE = \frac{1}{n}\sum_{k=1}^{n} |y_i - \hat{y}_i|; \quad \text{(formula (1))}$$

MAE is the minimum absolute value function, $y_i$ is the ith vector of the cell training image vector; $\hat{y}_i$ is the ith vector of the reconstructed image vector, and n is the vector dimension of the cell training image vector and the reconstructed image vector.

In one embodiment, when the preset error function is a mean square function, calculating a second error value between the cell training image vector and the reconstructed image vector using the mean square deviation function, the calculation formula being $$RSE = \frac{1}{n}\sum_{k=1}^{n} (y_i - \hat{y}_i)^2; \quad \text{(formula (2))}$$

RSE is mean square function, $y_i$ is the ith vector of the cell training image vector; $\hat{y}_i$ is the ith vector of the reconstructed image vector, and n is the vector dimension of the cell training image vector and the reconstructed image vector.

In one embodiment, the twin network model includes a first neural network and a second neural network. In one embodiment, using the cell training image vector set and the cell reconstruction image vector set to train the twin network model to obtain the trained twin network model, includes:

Inputting the cell training image vector in the cell training image vector set into the first neural network to obtain the first feature map;

Inputting the cell reconstruction image vector in the cell reconstruction image vector set into the second neural network to obtain a second feature map;

Calculating the third error value between the first feature map and the second feature map, optimizing the first neural network and the second neural network according to the third error value, and obtaining the trained twin network model.

In one embodiment, the weighting of the first neural network is the same as that of the second neural network, and the structure of the first neural network is the same as that of the second neural network.

In one embodiment, inputting the cell training image vector in the cell training image vector set into the first neural network to obtain the first feature map includes:

Inputting the cell training image vector into the first neural network;

Calculating the cell training image vector and the matrix in the first neural network to obtain the features of the cell training image vector and form the first feature map.

In one embodiment, calculating the third error value between the first feature map and the second feature map includes:

Calculating the average absolute value error between the first feature map and the second feature map using the average absolute value error function, and taking the average absolute value error as the third error value between the first feature map and the second feature map.

In one embodiment, calculating the third error value between the first feature map and the second feature map includes:

Calculating the mean square error between the first feature map and the second feature map using the mean square function, and taking the mean square error value as the third error difference between the first feature map and the second feature map.

The embodiment of the present disclosure can use cell images showing different density ranges to train the self-encoder to reconstruct the image and train the twin network model to distinguish between ranges of cell density, which can realize the accurate division of cell images with the same density range and improve the efficiency of cell image density grouping.

Figure 2:
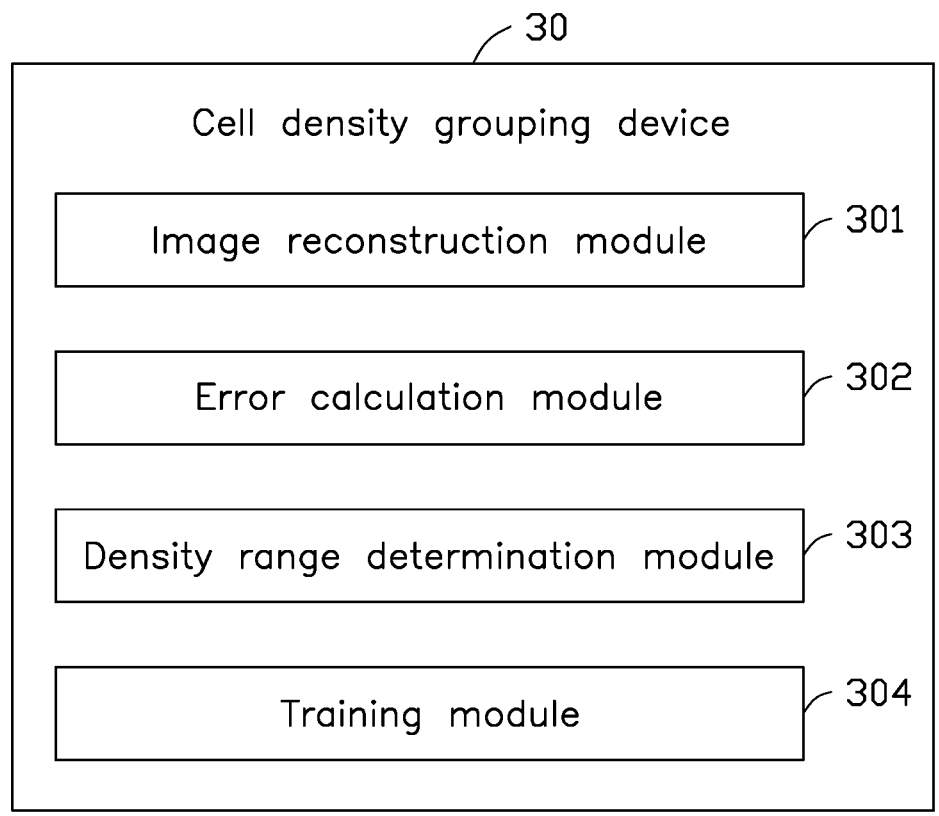
FIG. 2 is a block diagram of an embodiment of a device for grouping cell density according to the present disclosure.

FIG. 2 illustrates a block diagram of one embodiment of a cell density grouping device 30 according to the present disclosure.

In some embodiments, the cell density grouping device 30 operates in an electronic device. The cell density grouping device 30 may include a plurality of functional modules composed of program code segments. The program code of each program segment in the cell density grouping device 30 can be stored in a storage device and executed by at least one processor.

In the embodiment, the cell density grouping device 30 can be divided into a plurality of functional modules according to the functions performed. As shown in FIG. 2, the cell density grouping device 30 includes an image reconstruction module 301, an error calculation module 302, and a density range determination module 303. The modules in the present disclosure refer to a series of computer program segments that can be executed by at least one processor and can complete fixed functions, which are stored in the storage device.

The image reconstruction module 301 inputs images to be detected into a self-encoder of a preset number of a density grouping model to obtain the preset number of reconstructed images, each density grouping model is composed of the self-encoder and the twin network model. Each density grouping model corresponds to a density range, and each reconstructed image for analysis corresponds to a density grouping model.

The error calculation module 302 inputs the image to be detected and each reconstructed image into the twin network model of the density grouping model corresponding to each reconstructed image, and calculates a first error value between the image to be detected and each reconstructed image. The first error value set is composed of all the first error values, and each first error value corresponds to a density grouping model.

The density range determination module 303 determines a minimum first error value in the first error value set, and takes the density range corresponding to the density grouping model corresponding to the minimum first error value as the density range of the image.

In one embodiment, the cell density grouping device 30 further includes a training module 304, the training module 304 trains the density grouping model. In the embodiment, the training module 304 divides cell image set according to the density range to obtain a preset number of cell training image sets; each cell training image set corresponding to a density range. The training module 304 performs the training operation on each cell training image set to obtain a preset number of density grouping models, each density grouping model corresponding to a density range.

The training operation includes: converting the cell training image in the cell training image set into a cell training image vector, and a cell training image vector set is composed of all the cell training image vectors. The cell training image vector set is used to train the self-encoder to obtain the trained self-encoder; inputting the cell training image vector set into the trained self-encoder of the density grouping model to obtain the cell reconstruction image vector set; the cell reconstruction image vector set includes a cell reconstruction image vector; using the cell training image vector set and the cell reconstruction image vector set to train the twin network model to obtain the trained twin network model; and the trained self-encoder and the trained twin network model form the density grouping model.

In one embodiment, the training module 304 inputs the cell training image vector in the cell training image vector set into a coding layer of the self-encoder to obtain a hidden vector of the cell training image vector. The training module 304 inputs the hidden vector into a decoding layer of the self-encoder to obtain the reconstructed image vector of the cell training image vector. The training module 304 calculates a second error value between the cell training image vector and the reconstructed image vector through a preset error function, and adjusts the parameters of the encoding layer and the decoding layer to minimize the error value, to obtain the self-encoder of the density grouping model.

In one embodiment, when the preset error function is the minimum absolute value error function, the training module 304 calculates a second error value between the cell training image vector and the reconstructed image vector through the minimum absolute value function error, using formula (1);

As before, MAE is the minimum absolute value function, $y_i$ is the ith vector of the cell training image vector; $\hat{y}_i$ is the ith vector of the reconstructed image vector, and n is the vector dimension of the cell training image vector and the reconstructed image vector.

In one embodiment, when the preset error function is a mean square function, the training module 304 calculates a second error value between the cell training image vector and the reconstructed image vector using the mean square deviation function according to formula (2);

As before, RSE is mean square function, $y_i$ is the ith vector of the cell training image vector; $\hat{y}_i$ is the ith vector of the reconstructed image vector, and n is the vector dimension of the cell training image vector and the reconstructed image vector.

In one embodiment, the twin network model includes a first neural network and a second neural network. In one embodiment, the training module 304 uses the cell training image vector set and the cell reconstruction image vector set to train the twin network model to obtain the trained twin network model.

The training module 304 inputs the cell training image vector in the cell training image vector set into the first neural network to obtain the first feature map. The training module 304 inputs the cell reconstruction image vector in the cell reconstruction image vector set into the second neural network to obtain a second feature map. The training module 304 calculates the third error value between the first feature map and the second feature map, optimizes the first neural network and the second neural network according to the third error value, and obtains the trained twin network model.

In one embodiment, the weighting of the first neural network is the same as that of the second neural network, and the structure of the first neural network is the same as that of the second neural network.

In one embodiment, the training module 304 inputs the cell training image vector in the cell training image vector set into the first neural network to obtain the first feature map.

The training module 304 inputs the cell training image vector into the first neural network. The training module 304 calculates the cell training image vector and the matrix in the first neural network to obtain the features of the cell training image vector and form the first feature map.

In one embodiment, the training module 304 calculates the average absolute value error between the first feature map and the second feature map through the average absolute value error function, and takes the average absolute value error as the third error value between the first feature map and the second feature map.

In one embodiment, the training module 304 calculates the mean square error between the first feature map and the second feature map through the mean square function, and takes the mean square error value as the third error difference between the first feature map and the second feature map.

The embodiment of the present disclosure can use images of cells with different density ranges to train the self-encoder to reconstruct the image and train the twin network model to distinguish between ranges of cell density, which can realize the accurate division of cell images with the same density range and improve the efficiency of cell image density grouping.

FIG. 3 illustrate an electronic device 6 in accordance with an embodiment of the present disclosure.

The electronic device 6 can further include, but is not limited to, a storage device 61, at least one processor 62, and a program segment 63 stored in the storage device 61. The processor 62 may execute the program code of the program segment 63 to implement blocks 301-304 in method shown in FIG. 1. The processor 62 may execute the program code of the program segment 63 to implement the functions of a cell density grouping device 30 shown in FIG. 2.

The modules 301-304 include computer instructions or codes in form of one or more programs that may be stored in the storage device 61, and which are executed by the at least one processor 62. In other embodiment, the modules 301-304 may also be a program instruction or firmware that is embedded in the processor 62.

The one or more modules may be a series of computer program instruction segments capable of completing specific functions, the instruction segments are used to describe the execution process of the program segment 63 in the electronic device 6.

The block diagram merely shows an example of the electronic device 6 and does not constitute a limitation to the electronic device 6. In other examples, more or less components than those illustrated may be included, or some components may be combined, or different components used. For example, the electronic device 6 may also include input and output devices, a network access devices, a bus, and the like.

The processor 62 may be a central processing unit (CPU), or may be other general purpose processor, a digital signal processor (DSP), an application specific integrated circuit (ASIC), a Field-Programmable gate array (FPGA) or other programmable logic device, a transistor logic device, or a discrete hardware component. The general purpose processor may be a microprocessor. The processor 62 may also be any conventional processor. The processor 62 is a control center of the electronic device 6. The processor 62 connects the parts of the electronic device 6 using various interfaces and lines.

The storage device 61 can be used to store the program segment 63. The processor 63 operates or executes the program segment stored in the storage device 61 and recalls data stored in the storage device 61, and implements various functions of the electronic device 6. The storage device 61 mainly includes a storage program area and a storage data area, the storage program area may store an operating system, and an application (such as sound playback and image playback) required for at least one function. The storage data area may store data which is created.

The storage device 61 may include RAM, and may also include non-volatile memory such as a hard disk, a memory, a plug-in hard disk, a smart memory card (SMC), and a Secure Digital (SD) card, a flash card, at least one disk storage device, flash device, or other volatile or non-volatile solid-state storage device.

The modules and units integrated in the electronic device 6, if implemented in the form of software functional units and sold or used as separate products, may be stored in a computer readable storage medium. Based on such understanding, the present disclosure implements all or part of the processes in the foregoing embodiments, and the purposes of the disclosure may also be implemented and achieved by a computer program instructing related hardware. The computer program may be stored in a computer readable storage medium. The steps of the various method embodiments described above may be implemented by a computer program when executed by a processor. The computer program includes a computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), a random access memory (RAM), electrical carrier signals, telecommunications signals, and software distribution media. It should be noted that the content contained in the computer readable medium can be appropriately increased or decreased according to the requirements of legislation and patent practice in jurisdictions. For example, in some jurisdictions, according to legislation and patent practice, the computer readable medium does not include electric carrier signals and telecommunication signals.

In several embodiments provided by the present disclosure, it should be understood that the disclosed electronic devices and methods can be realized in other ways. For example, the electronic device described above is only schematic. For example, the division of the module is only according to logical function, and there may be other division mode in actual implementation.

Each functional module in each embodiment of the present disclosure can be integrated in the same processing module, each module can exist separately, or two or more modules can be integrated in the same module. The above integrated modules can be realized in the form of hardware or hardware plus software function modules.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method of grouping cell density comprising:
   inputting an image into a self-encoder of a preset number of a density grouping model to obtain the preset number of reconstructed images, wherein each of the density grouping model is composed of the self-encoder and the twin network model, each of the density grouping model corresponds to a density range, and each of the reconstructed images corresponds to a corresponding one of the density grouping model;
   inputting the image and each of the reconstructed images into a twin network model of the corresponding density grouping model of the reconstructed images, and calculating a first error value between the image and each of the reconstructed images; wherein a first error value set is composed of all the first error values, and each of the first error value corresponds to a corresponding one of the density grouping model;
   determining a minimum first error value in the first error value set, wherein the density range corresponding to the density grouping model having the minimum first error value as density range of the image; and training the density grouping model comprising:
  dividing the cell image set according to the density range to obtain a preset number of cell training image sets; wherein each of the cell training image set corresponds to the density range;
  performing training operation on each of the cell training image set to obtain a preset number of density grouping models; wherein each of the density grouping model corresponds to the density range;
  converting the cell training image in the cell training image set into a cell training image vector, wherein a cell training image vector set is composed of all the cell training image vectors;
  applying the cell training image vector set to train the self-encoder to obtain a trained self-encoder;
  inputting the cell training image vector set into the trained self-encoder of the density grouping model to obtain a cell reconstruction image vector set; wherein the cell reconstruction image vector set comprises a cell reconstruction image vector; and
  applying the cell training image vector set and the cell reconstruction image vector set to train the twin network model to obtain the trained twin network model; wherein the trained self-encoder and the trained twin network model form the density grouping model.

2. The method according to claim 1, further comprising:
inputting the cell training image vector in the cell training image vector set into a coding layer of the self-encoder to obtain a hidden vector of the cell training image vector;
inputting the hidden vector into a decoding layer of the self-encoder to obtain the reconstructed image vector of the cell training image vector;
calculating a second error value between the cell training image vector and the reconstructed image vector through a preset error function; adjusting the parameters of an encoding layer and a decoding layer to minimize error value to obtain the self-encoder of the density grouping model.

3. The method according to claim 1, further comprising:
inputting the cell training image vector in the cell training image vector set into a first neural network to obtain a first feature map;
inputting the cell reconstruction image vector in the cell reconstruction image vector set into a second neural network to obtain a second feature map;
calculating a third error value between the first feature map and the second feature map, optimizing the first neural network and the second neural network according to the third error value, and obtain a trained twin network model.

4. The method according to claim 3, wherein the first neural network and the second neural network are equally weighted, and structure of the first neural network is same as structure of the second neural network.

5. The method according to claim 3, further comprising:
inputting the cell training image vector into the first neural network;
calculating the cell training image vector and a matrix in the first neural network to obtain features of the cell training image vector and form the first feature map.

6. The method according to claim 3, further comprising:
calculating an average absolute value error between the first feature map and the second feature map through an average absolute value error function, and taking the average absolute value error as the third error value between the first feature map and the second feature map.

7. An electronic device, comprising:
a storage device; and
at least one processor, wherein the storage device stores one or more programs, when executed by the at least one processor, the one or more programs cause the at least one processor to:
input an image into a self-encoder of a preset number of a density grouping model to obtain the preset number of reconstructed images, wherein each of the density grouping model is composed of the self-encoder and the twin network model, each of the density grouping model corresponds to a density range, and each of the reconstructed images corresponds to a corresponding one of the density grouping model;
input the image and each of the reconstructed images into a twin network model of the corresponding density grouping model of the reconstructed images, and calculate a first error value between the image and each of the reconstructed images; wherein a first error value set is composed of all the first error values, and each first error value corresponds to a corresponding one of the density grouping model;
determine a minimum first error value in the first error value set, wherein the density range corresponding to the density grouping model having the minimum first error value as density range of the image;
divide the cell image set according to the density range to obtain a preset number of cell training image sets; wherein each of the cell training image set corresponds to the density range;
perform training operation on each of the cell training image set to obtain a preset number of density grouping models; wherein each of the density grouping model corresponds to the density range;
convert the cell training image in the cell training image set into a cell training image vector, wherein a cell training image vector set is composed of all the cell training image vectors;
apply the cell training image vector set to train the self-encoder to obtain a trained self-encoder;
input the cell training image vector set into the trained self-encoder of the density grouping model to obtain a cell reconstruction image vector set; wherein the cell reconstruction image vector set comprises a cell reconstruction image vector; and
apply the cell training image vector set and the cell reconstruction image vector set to train the twin network model to obtain the trained twin network model; wherein the trained self-encoder and the trained twin network model form the density grouping model.

8. The electronic device according to claim 7, wherein the at least one processor is further caused to:
input the cell training image vector in the cell training image vector set into a coding layer of the self-encoder to obtain a hidden vector of the cell training image vector;
input the hidden vector into a decoding layer of the self-encoder to obtain the reconstructed image vector of the cell training image vector;
calculate a second error value between the cell training image vector and the reconstructed image vector through a preset error function; adjust the parameters of an encoding layer and a decoding layer to minimize error value to obtain the self-encoder of the density grouping model.

9. The electronic device according to claim 7, wherein the at least one processor is further caused to:
input the cell training image vector in the cell training image vector set into a first neural network to obtain a first feature map;
input the cell reconstruction image vector in the cell reconstruction image vector set into a second neural network to obtain a second feature map;
calculate a third error value between the first feature map and the second feature map, optimize the first neural network and the second neural network according to the third error value, and obtain a trained twin network model.

10. The electronic device according to claim 8, wherein the first neural network and the second neural network are equally weighted, and structure of the first neural network is same as structure of the second neural network.

11. A non-transitory storage medium having stored thereon instructions that, when executed by a processor of a computer device installed in an electronic device, causes the processor to perform a grouping method, wherein the method comprises:
inputting an image into a self-encoder of a preset number of a density grouping model to obtain the preset number of reconstructed images, wherein each of the density grouping model is composed of the self-encoder and the twin network model, each of the density grouping model corresponds to a density range, and each of the reconstructed images corresponds to a corresponding one of the density grouping model;
inputting the image and each of the reconstructed images into a twin network model of the corresponding density grouping model of the reconstructed images, and calculating a first error value between the image and each of the reconstructed images; wherein a first error value set is composed of all the first error values, and each of the first error value corresponds to a corresponding one of the density grouping model;
determining a minimum first error value in the first error value set, wherein the density range corresponding to the density grouping model having the minimum first error value as density range of the image; and
training the density grouping model comprising:
dividing the cell image set according to the density range to obtain a preset number of cell training image sets; wherein each of the cell training image set corresponds to a density range;
performing training operation on each of the cell training image set to obtain a preset number of density grouping models; wherein each of the density grouping model corresponds to a density range;
converting the cell training image in the cell training image set into a cell training image vector, wherein a cell training image vector set is composed of all the cell training image vectors;
applying the cell training image vector set to train the self-encoder to obtain a trained self-encoder;
inputting the cell training image vector set into the trained self-encoder of the density grouping model to obtain a cell reconstruction image vector set; wherein the cell reconstruction image vector set comprises a cell reconstruction image vector;
applying the cell training image vector set and the cell reconstruction image vector set to train the twin network model to obtain the trained twin network model; wherein the trained self-encoder and the trained twin network model form the density grouping model.

12. The non-transitory storage medium according to claim 11, further comprising:
inputting the cell training image vector in the cell training image vector set into a coding layer of the self-encoder to obtain a hidden vector of the cell training image vector;
inputting the hidden vector into a decoding layer of the self-encoder to obtain the reconstructed image vector of the cell training image vector;
calculating a second error value between the cell training image vector and the reconstructed image vector through a preset error function; adjusting the parameters of an encoding layer and a decoding layer to minimize error value to obtain the self-encoder of the density grouping model.

13. The non-transitory storage medium according to claim 11, further comprising:
inputting the cell training image vector in the cell training image vector set into a first neural network to obtain a first feature map;
inputting the cell reconstruction image vector in the cell reconstruction image vector set into a second neural network to obtain a second feature map;
calculating a third error value between the first feature map and the second feature map, optimizing the first neural network and the second neural network according to the third error value, and obtain a trained twin network model.

14. The non-transitory storage medium according to claim 13, wherein the first neural network and the second neural network are equally weighted, and structure of the first neural network is same as structure of the second neural network.

* * * * *